(12) United States Patent
Krzanowski et al.

(10) Patent No.: US 9,130,839 B1
(45) Date of Patent: Sep. 8, 2015

(54) METHODS, SYSTEMS AND COMPUTER PROGRAM PRODUCT FOR SYNCHRONIZATION OF NETWORK PERFORMANCE TESTS

(75) Inventors: Roman Krzanowski, White Plains, NY (US); Prodip Sen, Spotswood, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1913 days.

(21) Appl. No.: 11/171,925

(22) Filed: Jun. 30, 2005

(51) Int. Cl.
*G06F 15/173* (2006.01)
*H04L 12/24* (2006.01)
*H04L 12/26* (2006.01)
*H04L 12/911* (2013.01)

(52) U.S. Cl.
CPC ........ *H04L 41/0823* (2013.01); *H04L 12/2697* (2013.01); *H04L 43/0876* (2013.01); *H04L 43/0882* (2013.01); *H04L 43/10* (2013.01); *H04L 43/50* (2013.01); *H04L 47/822* (2013.01)

(58) Field of Classification Search
CPC ... H04L 41/0823; H04L 47/822; H04L 43/10; H04L 43/50; H04L 12/2697; H04L 43/0876; H04L 43/0882
USPC ........................................................ 709/224
See application file for complete search history.

(56) References Cited

U.S. PATENT DOCUMENTS

| | | |
|---|---|---|
| 5,274,625 A | 12/1993 | Derby et al. |
| 5,553,058 A * | 9/1996 | Glitho .......................... 370/248 |
| 5,838,919 A | 11/1998 | Schwaller et al. |
| 6,023,773 A * | 2/2000 | O'Donnell et al. ............. 714/40 |
| 6,061,725 A | 5/2000 | Schwaller et al. |
| 6,397,359 B1 | 5/2002 | Chandra et al. |
| 6,408,335 B1 | 6/2002 | Schwaller et al. |
| 6,625,648 B1 * | 9/2003 | Schwaller et al. ............ 709/224 |
| 6,678,245 B1 | 1/2004 | Cooper et al. |
| 6,810,246 B1 | 10/2004 | Kalofonos et al. |
| 6,831,890 B1 | 12/2004 | Goldsack et al. |
| 6,912,679 B1 * | 6/2005 | Holloway et al. ............. 714/728 |
| 7,032,020 B2 * | 4/2006 | Gross ........................... 709/224 |
| 2003/0005044 A1 * | 1/2003 | Miller et al. .................. 709/203 |
| 2003/0033406 A1 * | 2/2003 | John et al. ..................... 709/224 |
| 2003/0151619 A1 * | 8/2003 | McBride ....................... 345/736 |
| 2004/0039550 A1 * | 2/2004 | Myers ........................... 702/186 |
| 2005/0044443 A1 * | 2/2005 | Magnaghi et al. ................. 714/4 |
| 2005/0193269 A1 * | 9/2005 | Haswell et al. .................. 714/38 |
| 2005/0283670 A1 * | 12/2005 | Natarajan et al. ............... 714/31 |

* cited by examiner

*Primary Examiner* — Viet Vu
*Assistant Examiner* — Herman Belcher

(57) ABSTRACT

Disclosed is a method and system allowing for network-wide synchronization of performance tests. The system consists of network collection devices or test probes and a central management system with pre-configured data structures, a test trigger mechanism and control algorithm for providing a precise control of traffic load and network-wide coordination of executing performance tests. In addition, multiple test patterns can be selected and customized for the specific needs and constraints of different types of networks to form the basis of scheduling performance tests to optimize the performance testing efficiency.

20 Claims, 14 Drawing Sheets

METHODS, SYSTEMS AND COMPUTER PROGRAM PRODUCT FOR SYNCHRONIZATION OF NETWORK PERFORMANCE TESTS

BACKGROUND

Performance based services guarantees or Service Level Agreements (SLAs) have become an integral component of any network data service offer. To support network performance SLAs network service providers must deploy a monitoring infrastructure overlaid on the production network. Typically, the monitoring infrastructure consists of network collection devices (NCDs, also called "test probes") and the associated control software. The NCDs generate test traffic along predefined network segments between designated network endpoints. The performance of this test traffic is used as a measure of the network performance. The control software manages operations of NCDs, collects test results from NCDs, aggregates test results and produces performance testing reports. FIG. 1A illustrates an exemplary monitoring infrastructure consisting of four NCDs 10 (i.e., NCD-1, NCD-2, NCD-3 and NCD-4) connected to a communication network 40 via network elements 30. The NCDs 10 are managed by the control software 20' over the communication network 40. The NCDs 10 can be managed in-band via one communication network or out-of-band via dedicated, physically separate management networks. For illustration purposes, the network elements 30 in FIG. 1A are four routers (i.e., Router-1, Router-2, Router-3 and Router-4). The network elements 30 are fully connected to the monitored network and may be placed in any part of the network: edge, access, core, backbone. In practice, each NCD or test probe may be physically attached to or integrated with a network element.

Complex networks require complex monitoring architectures with increasing number of NCDs. This may cause much difficulty in traffic management, given the fact that the amount of traffic generated by NCDs in complex networks may amount to 3-5% of the network bandwidth. While this amount of traffic may not present a problem in the core or backbone networks, it may cause congestion on the low grade access links or in high-priority real time queues. Currently, in order to avoid traffic congestion in the monitored network, either the amount of generated test traffic or the number of network segments covered by tests has to be limited. In either case, however, the accuracy of measurements is compromised.

Another problem with current network performance management is called "test storms". It refers to a condition where certain interfaces at times are flooded with large amount of test traffic while at other times these interfaces are idle. When many NCDs run traffic tests at random times without sufficient coordination, test storms are likely to occur. To avoid "test storms", one solution is to schedule performance tests that are to be executed by NCDs. Under current test scheduling methods, however, the NCDs are only pair-wise synchronized and no network-wide coordination of performance tests is available. The pair-wise synchronization, as illustrated in FIG. 1B, requires pre-selection of an NCD pair 14 (NCD-1 and NCD-2) or 16 (NCD-3 and NCD-4) for defining a test connection or test path 12'. After all tests are performed along this test connection 12', the control software 20' selects another pair of NCDs for testing the connection in between. Under this approach, "test storms" may be avoided. However, the overall testing efficiency is compromised.

In light of the above, there exists a need for a precise control of the amount of traffic generated by the active network performance tests without limiting the overall number of tests, test frequency, or the number of test paths covered by tests. There is a further need to avoid "test storms" through the network-wide coordination of executing test sequences and individual tests among all the testing devices in the network.

BRIEF DESCRIPTION OF THE SEVERAL VIEWS OF THE DRAWING(S)

Reference will be made to the accompanying drawings, which are not necessarily drawn to scale, and wherein.

Figure 2:
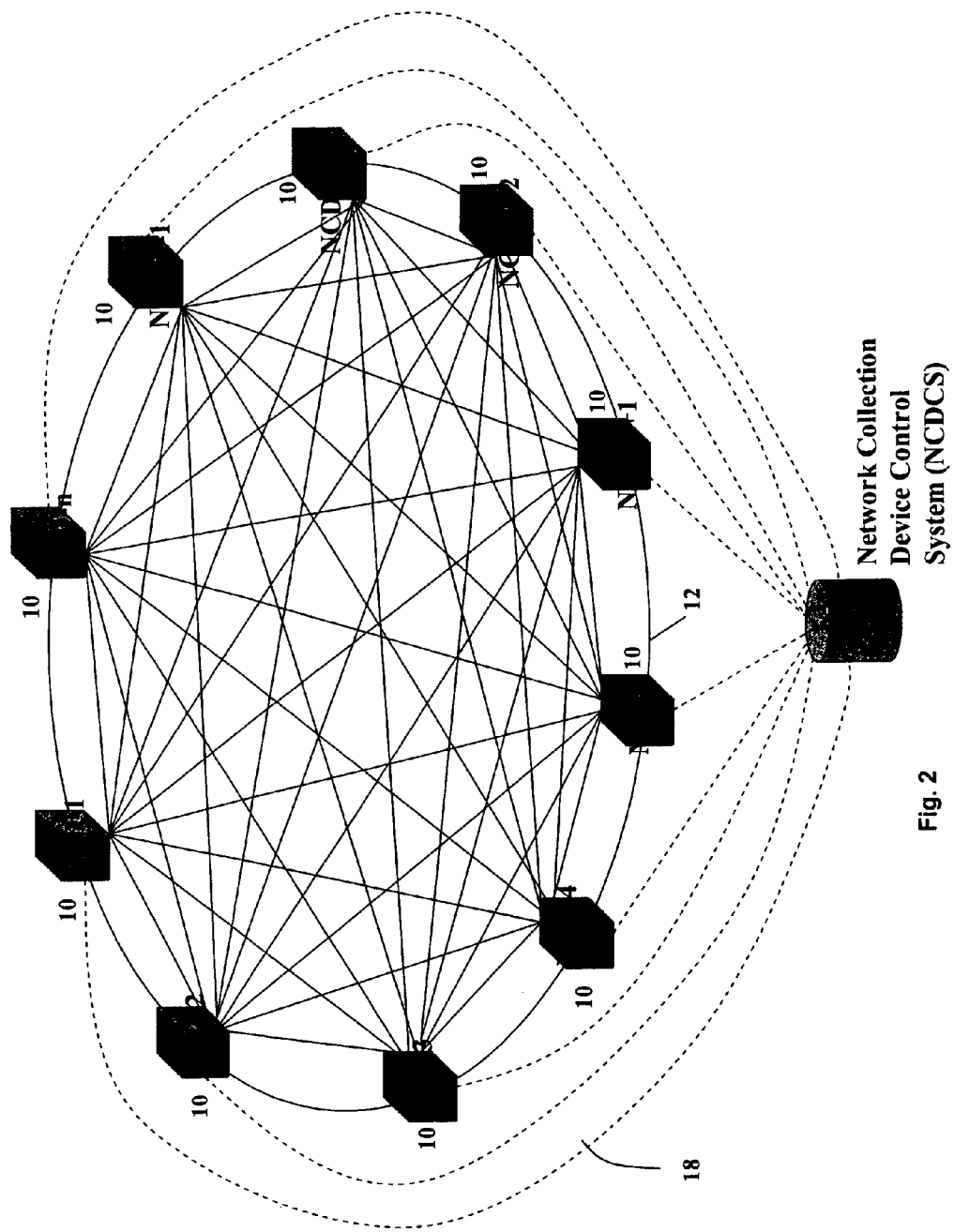
Figure 3:
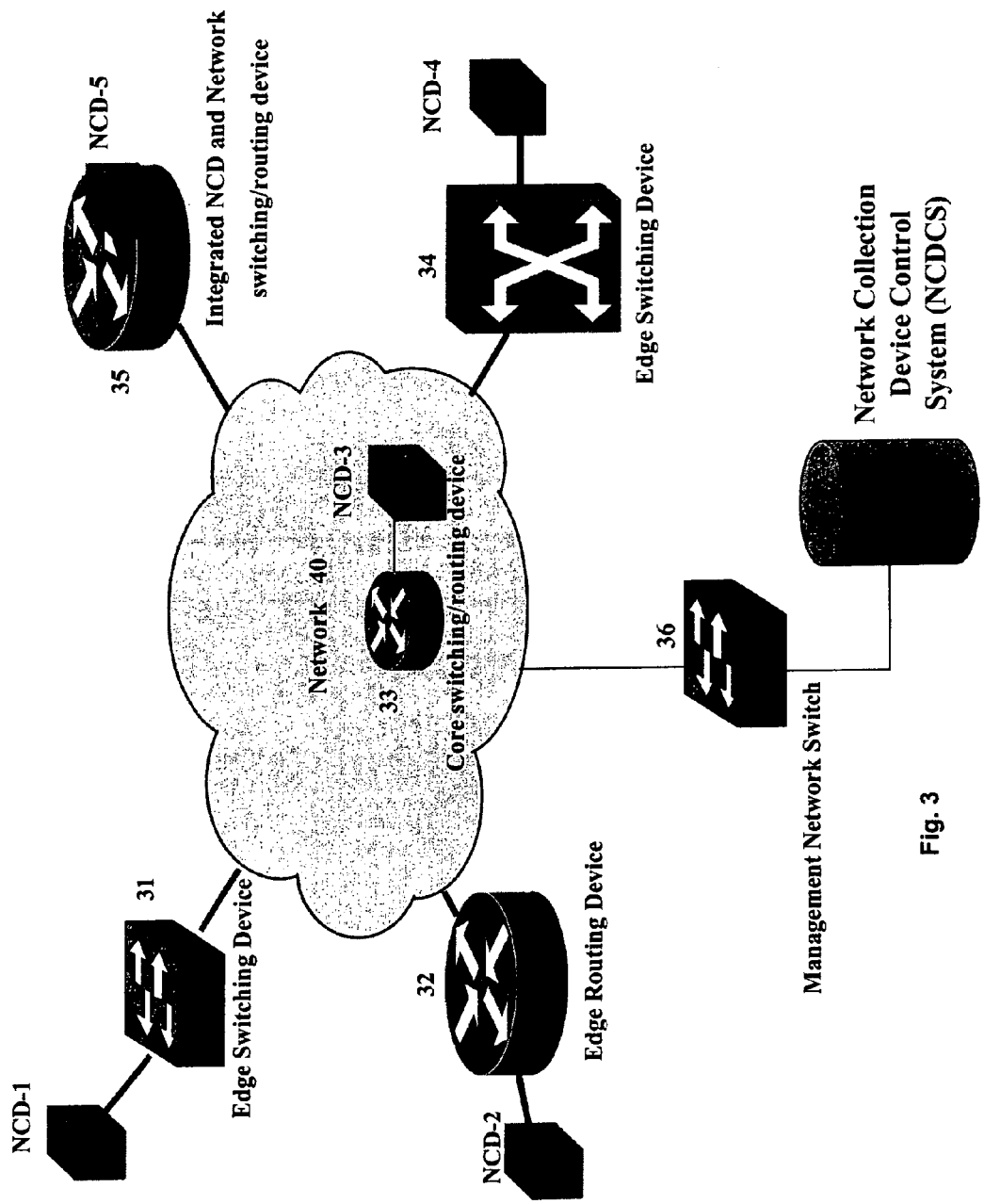
Figure 4:
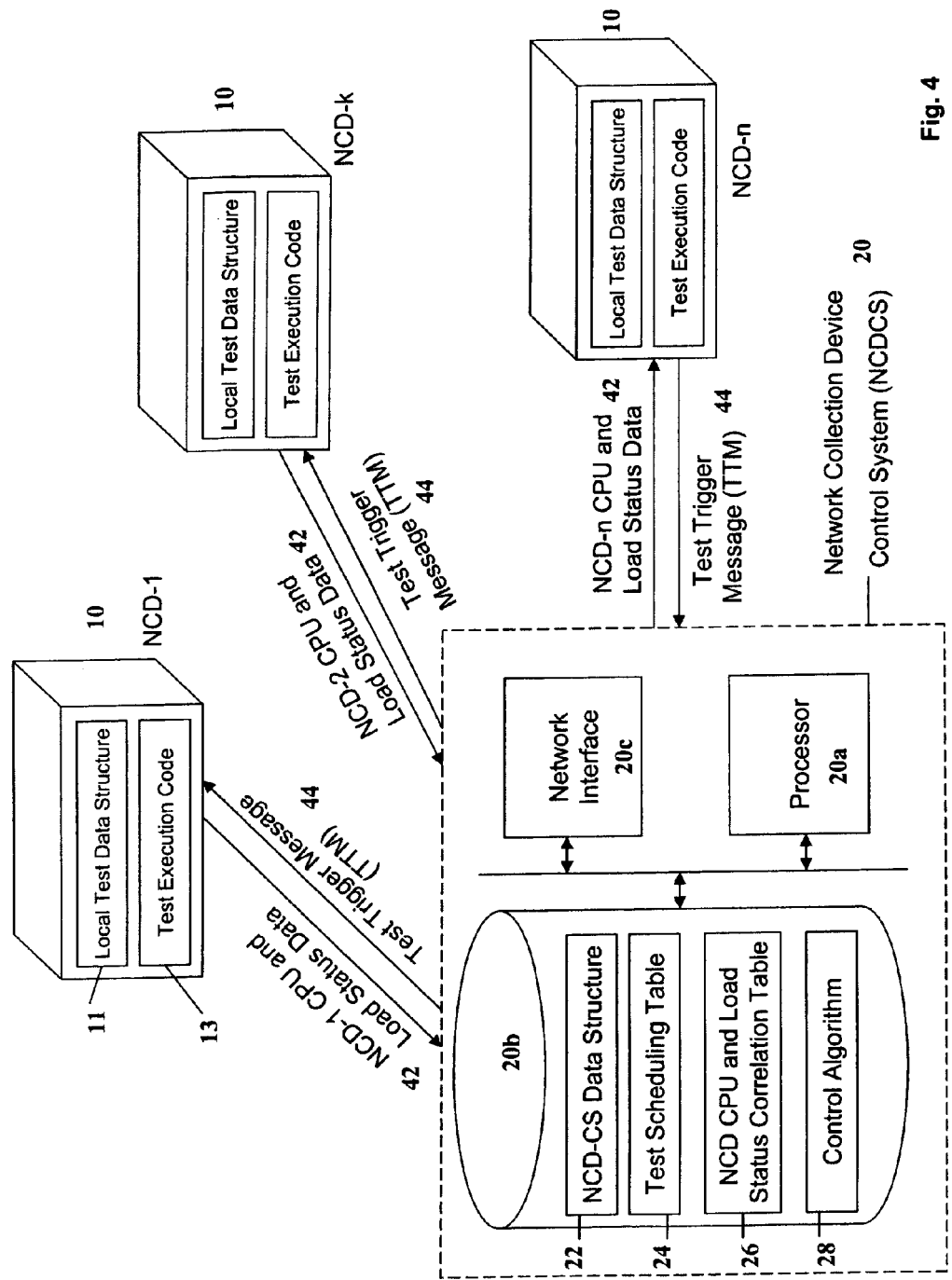
Figure 5:
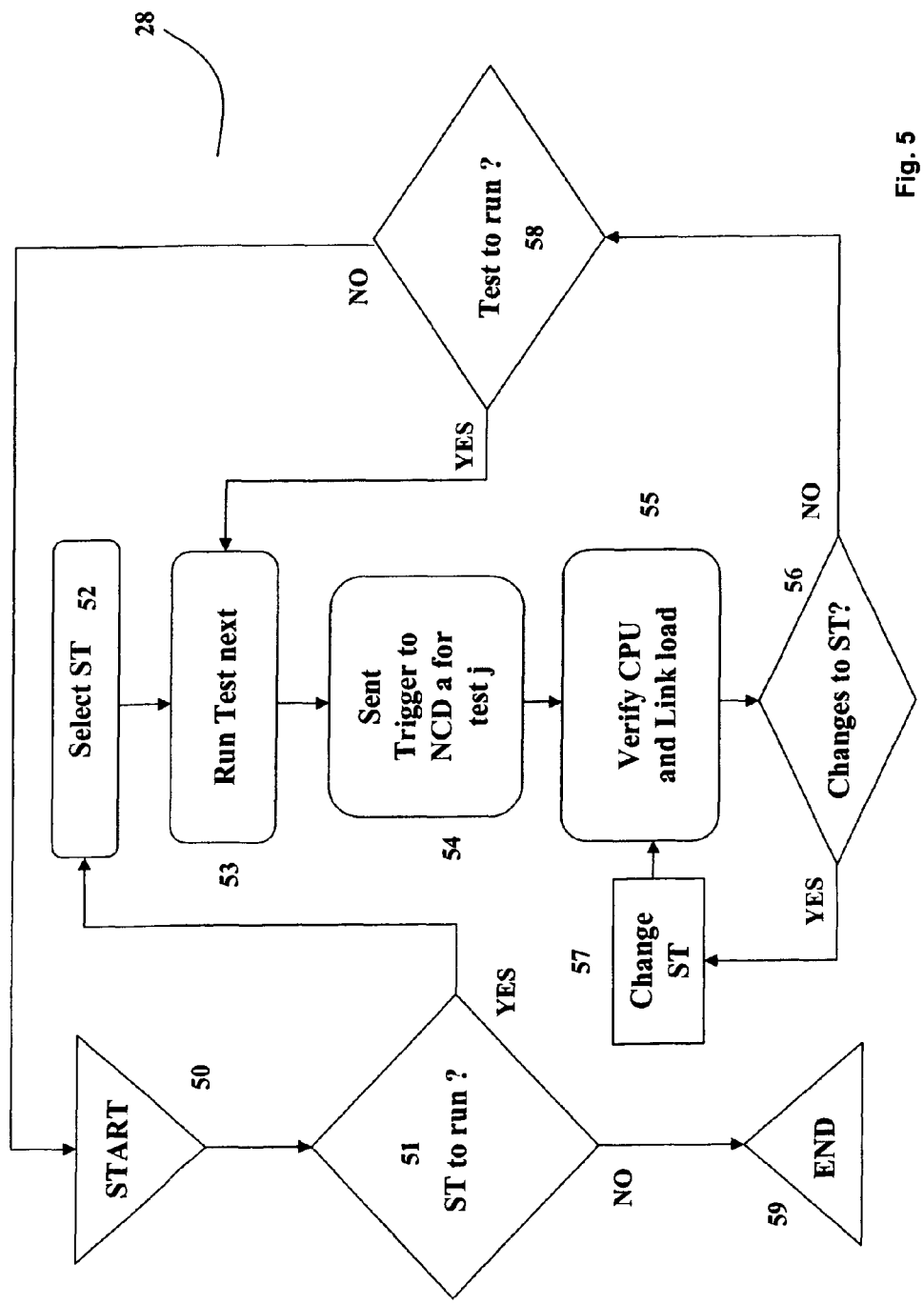
Figure 6A:
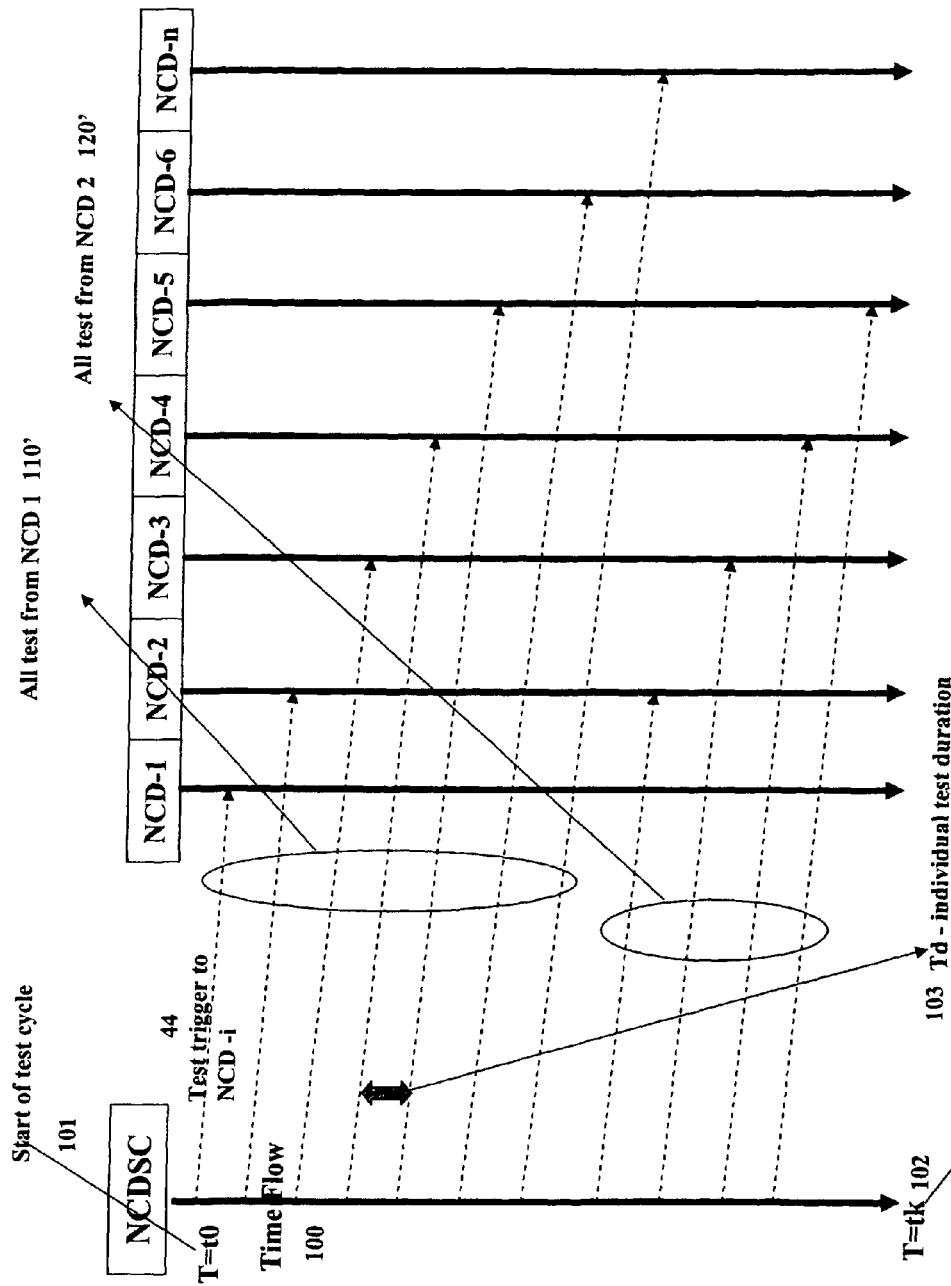
Figure 6B:
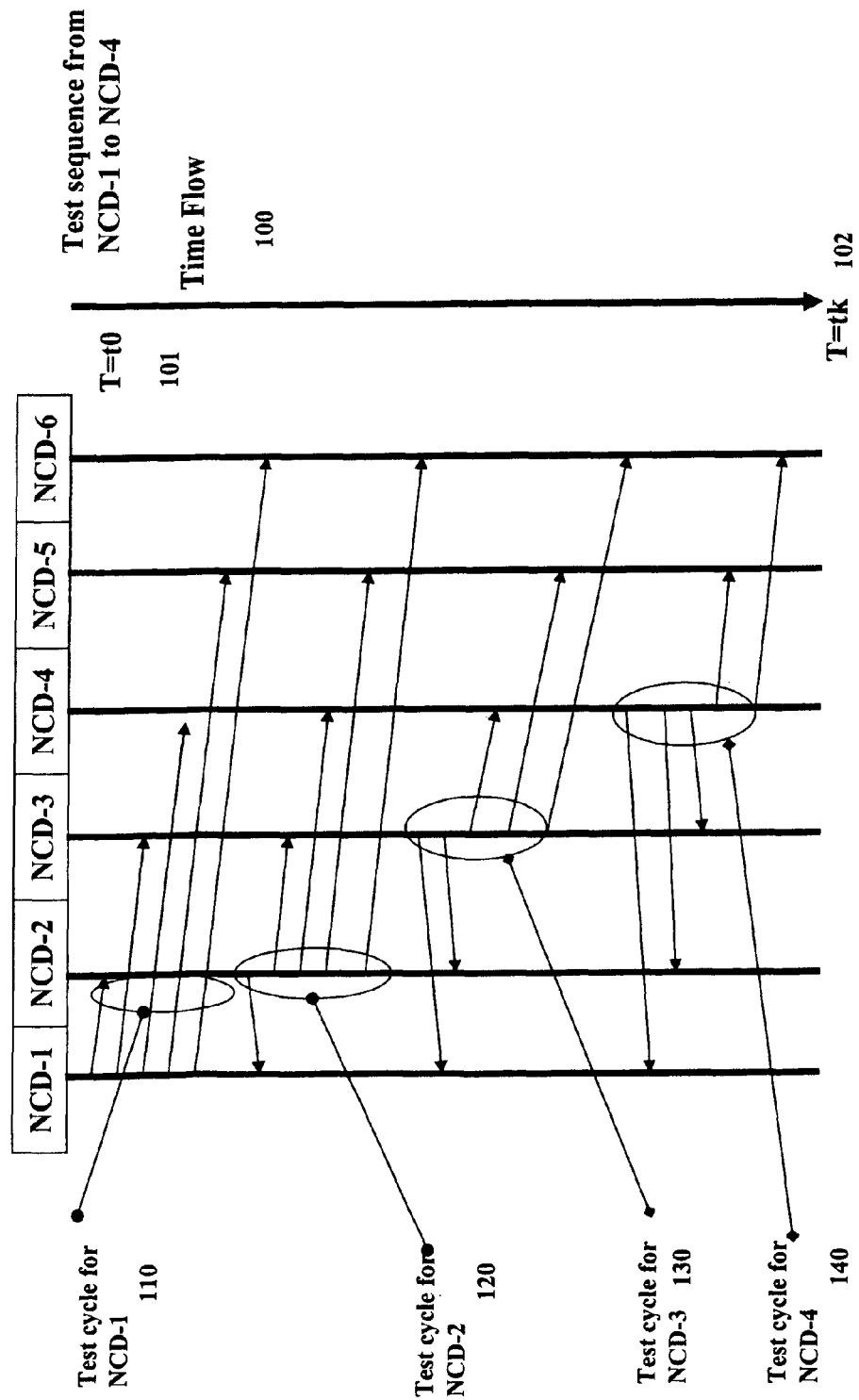
Figure 11:
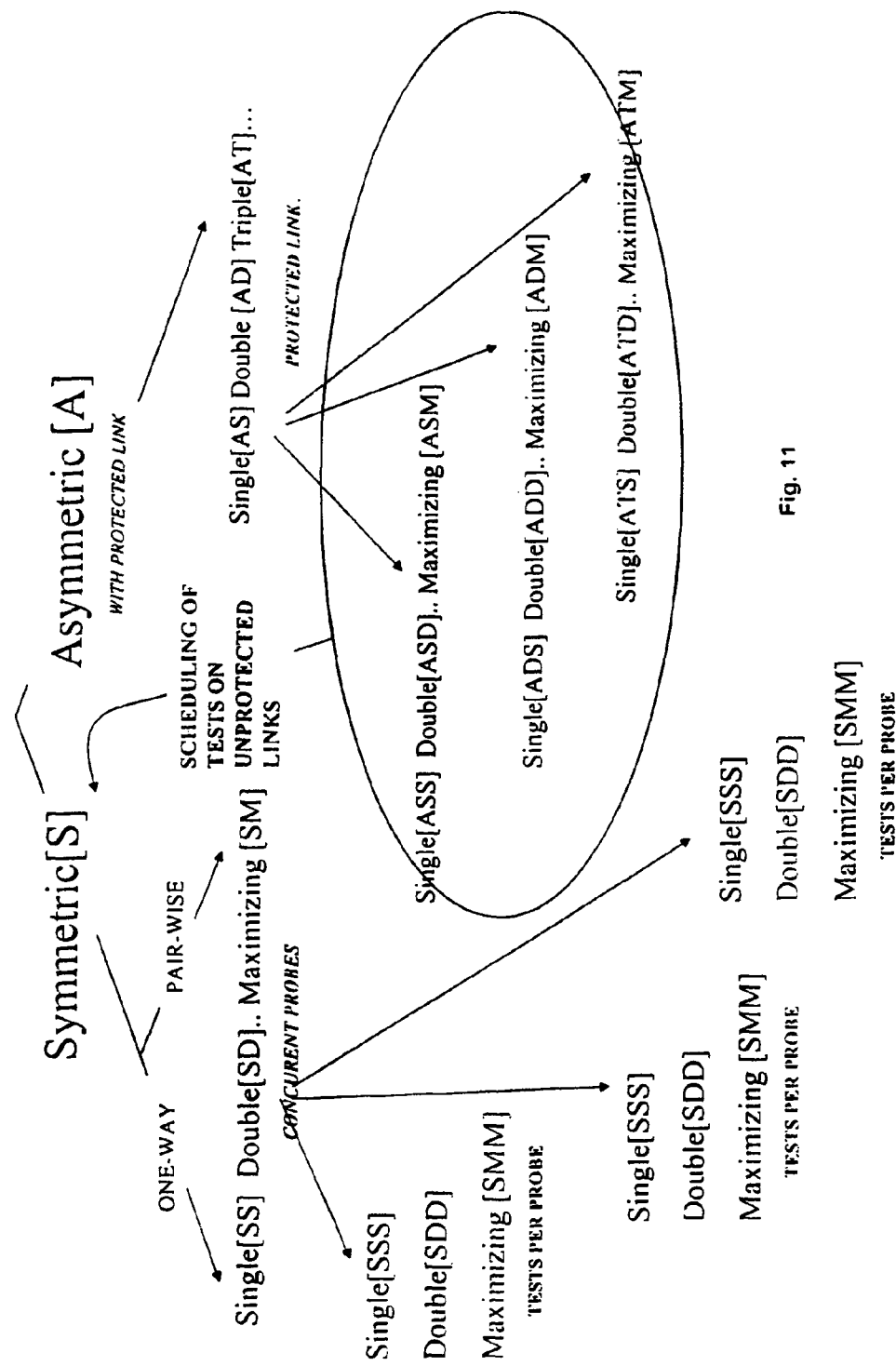
Figure 12:
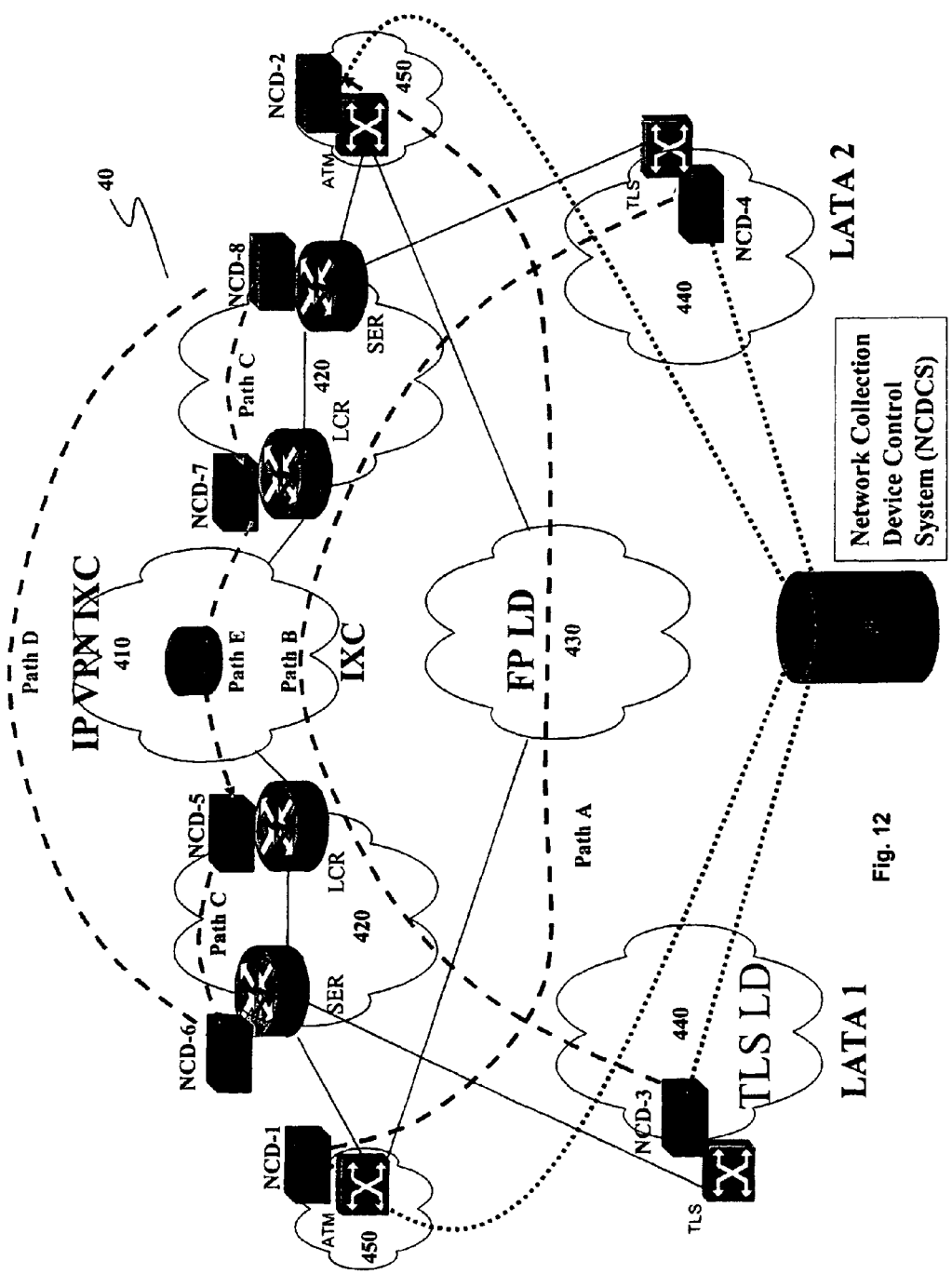

FIG. 2 provides a logical architectural view of a system for central control of network performance testing according to one embodiment of the present invention;

FIG. 3 provides a physical architectural view of the system in FIG. 2 according to one embodiment of the present invention;

FIG. 4 presents various system components and their interactions in the system of FIG. 2 according to one embodiment of the present invention;

FIG. 5 is a flow diagram illustrating a control algorithm executed by the system in FIG. 2 according to one embodiment of the present invention;

FIG. 6A presents system operations from the perspective of a central control server of the system in FIG. 2 according to one embodiment of the present invention;

FIG. 6B presents system operations from the perspective of NCDs of the system in FIG. 2 according to one embodiment of the present invention;

FIGS. 7-10 present exemplary test patterns that may be employed in the system of FIG. 2 according to one embodiment of the present invention;

FIG. 11 provides a test sequences taxonomy summarizing various test patterns that may be applicable in the system of FIG. 2 according to one embodiment of the present invention; and FIG. 12 provides an example illustrating how the system of FIG. 2 is implemented according to one embodiment of the present invention.

DETAILED DESCRIPTION OF PREFERRED EMBODIMENTS

The preferred embodiments now will be described hereinafter with reference to the accompanying drawings, in which exemplary embodiments and examples implemented according to the invention are shown. Like numbers refer to like elements throughout.

System Overview

One embodiment of the invention provides a system for providing central control and synchronization of network performance testing. The monitoring infrastructure of this system consists of a number of network collection devices (NCDs) placed at various endpoints of the measured network segments. The system also includes a network collection device control system (NCDCS), typically embodied in part by computer software that resides on a central server computer, for providing centralized management of the NCDs. Specifically, the NCDCS provides network-wide synchronization of performance tests and precise control of test traffic by sending test initiation triggers to the NCDs in accordance with pre-defined test schedules that are customized for particular networks, monitoring the traffic load on the interfaces to the NCDs, monitoring the CPU status of the NCDs, and collecting the tests results from the NCDs. On the other hand, each NCD in the system is pre-configured for executing specific tests upon receiving the trigger messages from the NCDCS, in addition to originating test traffic, monitoring the load on the interfaces, collecting and reporting the test results. The pre-configuration of NCDs enhances the testing efficiency by eliminating the need to configure testing probes or devices during network performance testing.

System Architecture

Figure 1A:
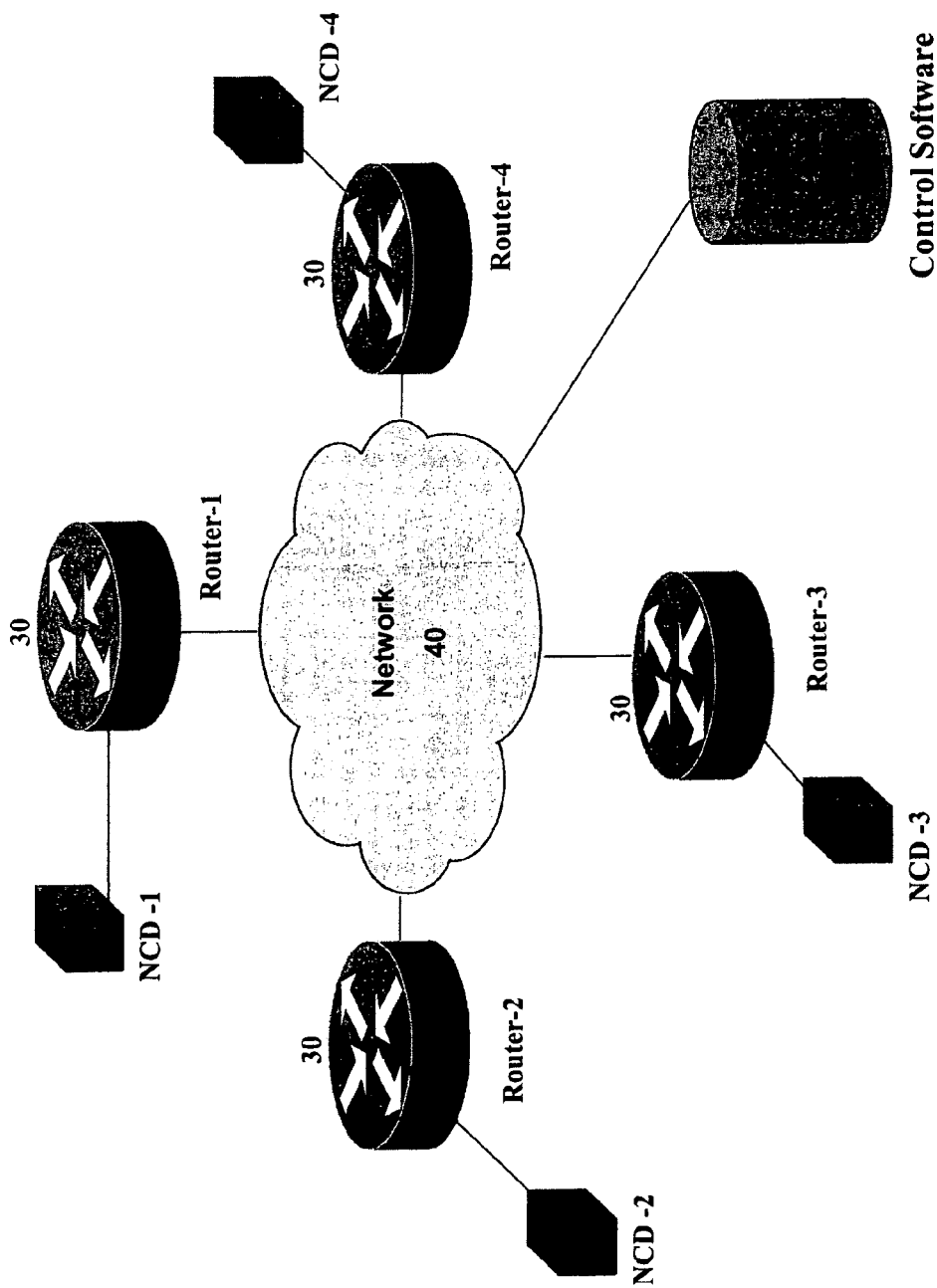
FIG. 1A illustrates an example of current monitoring architectures to support network performance SLAs.
Figure 1B:
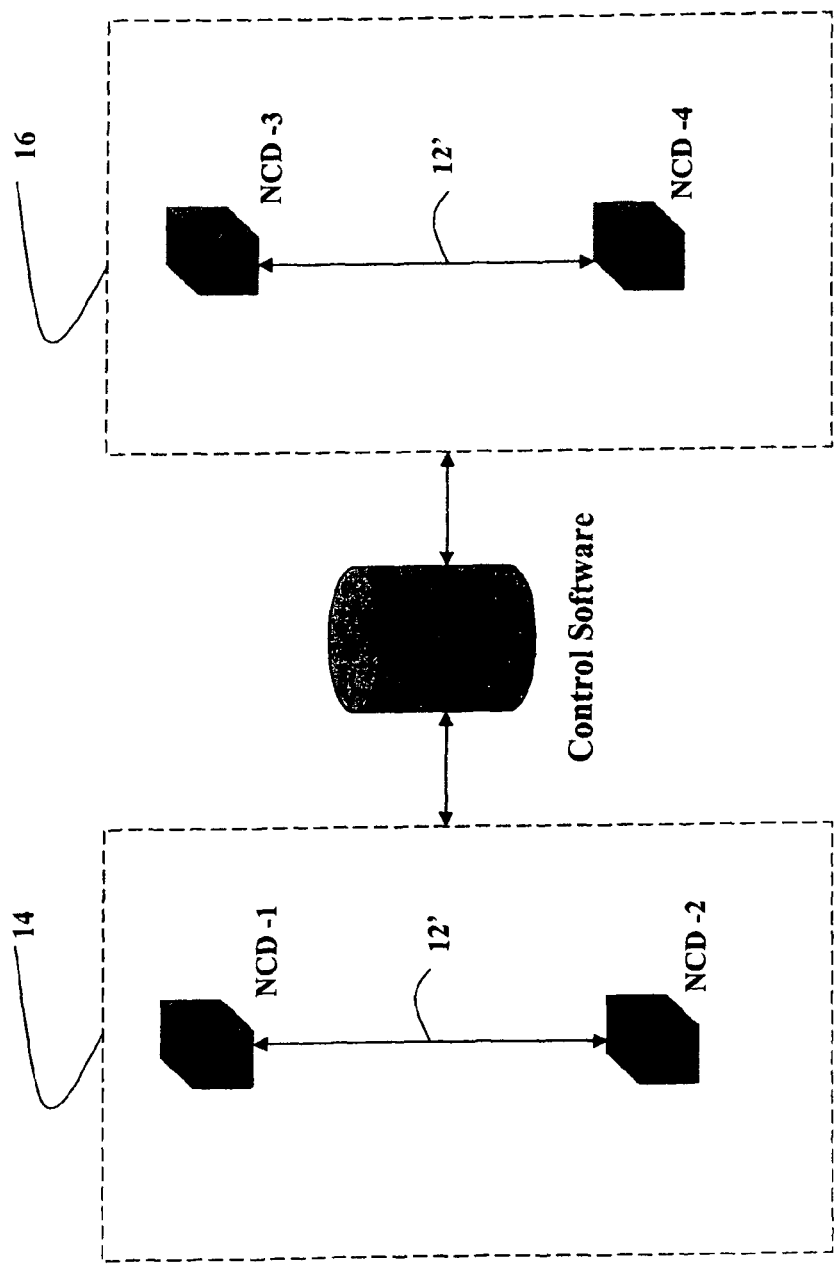
FIG. 1B illustrates the pair-wise synchronization of NCDs (Network Control Devices) performing network tests in current monitoring architectures.

Turning to FIG. 2, a logical architectural view of the above-described embodiment of the system is depicted. Unlike the previous pair-wise connections in FIG. 1B, all of the NCDs 10 (NCD-1, NCD-2 . . . NCD-n) in FIG. 2 are logically connected. In other words, there are logical paths 12 directly connecting each NCD to every other NCD of the monitored network. None of the logical connections 12 between two NCDs would traverse any other NCDs. These logical connections 12 between NCDs 10 are realized over the network production interfaces. In practice, the number and location of NCDs 10 may vary depending on specific network architectures. Typically, NCDs 10 are located at selected strategic locations of the monitored network, such as edge, customer premises, core, backbone, etc. The NCDs 10 define the network segments to be monitored by connecting to the network elements placed on the end points of each network segment. These network elements are usually routers for "Layer 3" networks or switches for "Layer 2" networks, but it is to be understood that such network elements may also be DSL muxes, a converged switch platform, a network interface device (NID), or other traffic-bearing device deployed in the network. The NCDs 10 are connected to the routers (RT) or switches (SW) over a dedicated link, which can be of any type that is compatible with specific network architectures. In terms of logical connections 12, however, all these routers, switches, and any other intermediate links are transparent from the perspective of NCDs 10. All NCDs 10 are also connected to the control system, namely, NCDCS 20, which provides central management of operations of NCDs 10, through the management ports of the NCDs 10. The logical connections 18 between the NCDs 10 and NCDCS 20 are realized over the dedicated network (out of band) or over the production interfaces (in band). As will be described in detail below, in operation, NCDs 10 send test traffic over the NCD-to-NCD logical links 12, while NCDCS 20 sends trigger messages for initializing tests, retrieves test results, and obtains the NCD CPU and interface load status over the NCDSC-to-NCD logical links 18.

FIG. 3 presents the physical view of the system architecture. As seen in FIG. 3, NCDs 10 (NCD-1, NCD-2, NCD-3, NCD-4, NCD-5) are connected with the NCDCS 20 over the communication network 40. The connection is realized through a management network switch 36, or any other equivalent means. As will be understood by those having ordinary skill in the art, the communication network 40 may be comprised of a plurality of separate linked physical communication networks which, using a protocol such as the Internet Protocol (IP), may appear to be a single seamless communications network to user application programs. It is further to be understood that, while for illustration purposes in FIG. 3, the communication network 40 is shown as a single network, it may be comprised of a plurality of separate interconnected physical networks or partitioned sections of a physical network. The communication network 40 interfaces to NCDs 10 over the dedicated management port on NCDs 10. The NCDs 10 are connected to the production network elements over the dedicated link to the dedicated port that may be of any type but must be fully supported by the NCD (e.g., Ethernet, POS, ATM, FR). In FIG. 3, the network elements 30 are exemplified as comprising an edge switching device 31 connected to NCD-1, an edge routing device 32 connected to NCD-2, a core switching/routing device 33 connected to NCD-3, an edge switching device 34 connected to NCD-4, and a network switching/routing device 35 with NCD-5 integrated therein.

System Components

As shown in the above system architecture, the system at a high-level consists of multiple NCDs to that are managed entirely by the NCDCS 20 over the communications network 40. In a detailed view, each NCD is comprised of further logical components and so is the NCDCS 20. As illustrated in FIG. 4, each NCD 10 contains a Local Test Data Structure (LTDS) 11 and Test Execution Code (TEC) 13. The NCDCS 20 comprises a processor 20a, and a memory 20b (e.g., computer-readable storage medium) that is accessible to the processor 20a, and a network interface 20c. The memory 20b is configured to store an NCDCS Data Structure 22, a test Scheduling table (ST) 24, an NCD CPU and Link Status Correlation Table 26 and a Control Algorithm 28 that are associated with the NCDCS 20. Through the network interface 20c, the Test Trigger Message (TIM) 44 and NCD CPU and Load Status Data 42 are communicated between the NCDs to and NCDCS 20. Each of these components will be described in detail below.

Each NCD is pre-configured with a unique IP address and a unique ID. The NCD ID may be any alphanumeric string to permit the NCD to be uniquely identified to the NCDCS. Each NCD is also pre-configured with the Local Test Data Structure (LTDS) 11. In an exemplary embodiment, the LTDS 11 includes the following elements:

TABLE 1

Local Test Data Structure (LTDS)

| Elements | Description | Exemplary Data Value |
| --- | --- | --- |
| Test ID-NCD | locally significant for a given NCD; can be any alphanumeric symbol. | <IP000B1> |
| Target NCD | an IP address or an NCD ID | <NCDCLI002> |
| Test Parameters | Test specific | <100 packets, 252 bytes/packet; 20 ms interpacket gap, DSCP = 0> |

As seen in the above table, the Test ID-NCD is locally significant because it may require specific addressing requirements, such as certain ID format or content, thereby making it difficult to carry the Test ID-NCD over as a global identifier. The Target NCD is identified by an IP address or a unique ID. The Test Parameters include all test specifics to be parsed by the NCDs for executing the performance tests.

Also, each NCD is pre-configured with the Test Execution Code 13. By means of pre-storing the Test Execution Code 13 in each NCD, no additional configuration other than a test trigger message 44 is needed to start the performance tests on a given NCD.

The NCDCS 20 is configured with a data structure 22 that includes all of the tests pre-configured on all NCDs. In an exemplary embodiment, the NCDCS Data Structure 22 includes the following elements:

TABLE 2

NCDCS Data Structure

| Elements | Description | Exemplary Data Value |
|---|---|---|
| Test ID-G | globally significant NCD ID that identifies an NCD in the network; can be any alphanumeric symbol | <T002> |
| Test ID-NCD | locally significant for a given NCD; can be any alphanumeric symbol. | <IP000B1> |
| Originating NCD | an IP address or an NCD ID | <NCDCLI0001> |
| Target NCD | an IP address or an NCD ID | <NCDCLI0003> |
| Test Bandwidth in bps | Test BW in bits per second (bps) | <120000> |

The test scheduling table (ST) 24 stored in the NCDCS 20 specifies starting times for initializing tests in accordance with a pre-designed testing pattern which will be described in detail with reference to FIGS. 7-11. As illustrated below, in one embodiment the test scheduling table (ST) 24 contains a list of tests to be performed in the system, test sequences, all NCD identifiers, and flags that signify whether tests are concurrently active. The test scheduling table (ST) 24 is designed specifically as including particular test patterns. However, the structure of the table and specification of different tests are identical for a given network regardless of the test patterns. The test scheduling table (ST) 24 reflects the NCD topoloty within the network as well as all different types of tests.

All concurrent tests are assigned a test sequence and any tests in the same sequence are initiated without any inter test delay. After one sequence is finished the next sequence starts right after the inter test delay gap expires. In operation, the test scheduling table (ST) 24 varies with specific systems that are customized for testing particular network architectures.

TABLE 3

Test Scheduling Table (ST)

| Elements | Description |
|---|---|
| Test Sequence | globally significant NCD ID that identifies an NCD in the network; can be any alphanumeric symbol |
| Test ID-G | globally significant NCD ID that identifies an NCD in the network; can be any alphanumeric symbol |
| Test ID-NCD | locally significant for a given NCD; can be any alphanumeric symbol. |
| Originating NCD | an IP address or an NCD ID |
| Target NCD | an IP address or an NCD ID |
| Flag | 0 or 1; signify the concurrency of tests |

Below lists specific test sequence examples:
Test Sequence: <1>
Test ID-G: <T002> note: global network wide test id
Test ID-NCD: <IP000B1> note; NCD specific test id
Originating NCD iD: <NCDCLI0001>
Target NCD ID: <NCDCLI0003>
Flag: 1
Test Sequence: <1>
Test ID-G: <T002>
Test ID-NCD: <IP000B2>
Originating NCD iD: <NCDCLI0001>
Target NCD ID: <NCDCLI0004>
Flag: 1
Test Sequence: <2>
Test ID-G: <T002>
Test ID-NCD: <IP000B1>
Originating NCD iD: <NCDCLI0001>
Target NCD ID: <NCDCLI0005>
Flag: 0
Test Sequence: <2>
Test ID-G: <T002>
Test ID-NCD: <IP000B1>
Originating NCD iD: <NCDCLI0001>
Target NCD ID: <NCDCLI0003>
Flag: 0

Based on the test scheduling table (ST) 24, the NCDCS 20 sends test trigger messages 44 to specific NCDs for initializing the test sequences or individual tests. The test scheduling table (ST) 24 may be adjusted based on the NCD CPU status and link load to the desired level of the traffic load and CPU utilization.

In this regard, the NCDCS 20 collects the NCD CPU and link performance data 42 from NCDs 10 and stores the same in the NCD CPU and Load Status Correlation Table 26. When the CPU load on an NCD or the traffic load per interface increases beyond the predefined threshold, the tests for this NCD (incoming and originating) are delayed and executed either after a predefined time lapses or out of sequence. In this way the NCDCS 20 assures that the test traffic load never exceeds the pre-defined test load and the NCD CPU will operate within the optimal performance parameters, and thus the test results will not be affected by any testing device itself.

A test trigger message 44 is a minimal message for the NCD management access protocol. It contains the message type (i.e., a trigger, usually 4 bits), and the test ID (usually 12 bits). This message is typically encapsulated into the Layer 4, Layer 3 and Layer 2 headers. Any protocol (for example, SNMP) can be used to transport the trigger message 44. Because the test trigger message 44 contains only a test ID that is locally significant, sending frequent test triggers would not create excessive traffic on the management links between the NCDs 10 and NCDCS 20. The test trigger message 44 can be used for initializing the entire test sequence as well as each individual test.

The control algorithm 28 implemented by the NCDCS 20 is driven by the test scheduling table (ST) 24. It activates specific tests on various NCDs according to the test scheduling table (ST) 24. FIG. 5 presents a step-by-step process under the control algorithm 28. As seen in FIG. 5, the process starts at Step 50 and determines whether a request is received to run a specific scheduling table (ST) 24 at Step 51. If no request is received, the process ends at Step 59. Otherwise, upon receiving of a request for running an ST 24, the specific scheduling table (ST) 24 is selected in Step 52. Subsequent to that selection, the algorithm 28 takes the first test or sequence of tests on the list at Step 53, by sending the test message trigger 44 to respective NCD or NCDs to run the specific tests. As shown at Step 54, the test trigger 44 is sent to the NCD-a for running Test j. After the test trigger 44 is sent, at Step 55 the algorithm 28 verifies the CPU load and link status on the NCD(s) involved in the test against pre-defined test loads. Depending on the verified NCD CPU status and link load, the NCDCS 20 determines whether the test scheduling table (ST) 24 needs to be adjusted or changed for obtaining the desired level of the traffic load and CPU utilization, as shown in Step 56. As an example, if the traffic load is too high for a particular NCD, the tests to be performed on that NCD may be rescheduled to start at a later time. If it is determined that the ST 24 needs to be adjusted, the necessary revisions will be made to the ST 24 in Step 57. Otherwise the NCDCS 20 continues to determine whether there are any tests or sequence of tests in the ST to be executed at Step 58. If there are additional tests to run, the algorithm 28 goes back to the running loop starting from Step 53. If there are no more tests in the ST 24 the algorithm 28 goes back to the main loop to verify whether to restart the test sequence or terminate the tests.

System Operations

Referring to FIGS. 6A-B, the system operations will be described from two different perspectives. Specifically, FIG. 6A presents the system operations from the perspective of the NCDCS 20, while FIG. 6B from the perspective of NCDs 10.

In FIG. 6A, there is a line of Time Flow 100 representing the progress of time from the starting point 101 (T=t0) till the ending point 102 (T=tk). The inter-test delay is represented by Td 103. The Td time 103 between the tests is a time needed for an NCD to complete one test probe. By spacing tests at Td intervals, the system in FIG. 6A assures that no two tests are concurrently active. In practice, the NCDCS 20 sends a test trigger message 44 to selected NCDs 10 (NCD-1, NCD-2, NCD-3, ... NCD-n) at specified times, e.g., T=t0, T=t0+Tt, T=t0+2*Tt, ... T=tk. The selected NCDs 10, upon receiving the test trigger message 44, initiate the test sequences requested in the trigger message. The NCDs 10 also collect and store test results for future reference or until a request for transfer of the results comes from the NCDCS 20. This test process is repeated until the full test cycle is completed. Upon the completion of the test cycle a new test cycle may be initialized. FIG. 6A illustrates a specific test process that starts at the time of T=t0 when the NCDCS 20 sends the test trigger message 44 to NCD-1. The trigger message 44 activates the test specified in the trigger message 44 on NCD-1. After the predefined time Td 103, the NCDCS sends a second trigger message to NCD-1 for testing the connection between NCD-1 and NCD-2. Subsequently, a third trigger message is sent to NCD-1 for testing the path from NCD-1 to NCD-3. This test cycle 110' is repeated until all the tests that NCD-1 is supposed to execute in this schedule are activated and completed. When the test cycle of tests originated at the NCD-1 is completed the NCDCS 20 initializes the similar test cycle for tests originating at the NCD-2. Again, the test cycle 120' is repeated for the NCD-2. When the test cycle of tests originated at the NCD-2 is completed the NCDCS 20 initializes the similar test cycle for tests originating at the NCD-3. The process is repeated until all NCDs have completed their test cycles.

The same sequence as described above is represented in FIG. 6B from the perspective of each NCD 10. During the Time Flow 100 between the starting point 101 (T=t0) and the ending point 102 (T=tk), the test process consists of multiple test cycles originated by each of a plurality of NCDs 10. For example, the test cycle 110 comprises tests originated from NCD-1 firstly to NCD-2, secondly to NCD-3, thirdly to NCD-4, fourthly to NCD-5, and finally to NCD-6. When the test cycle 110 is finished, a new test cycle 120 is initialized for executing tests activated from NCD-2 to other NCDs in the monitored network. The same process repeats with the test cycle 130 for NCD-3, test cycle 140 for NCD-4, etc., until all NCDs complete their test cycles.

System Implementation: Test Pattern Design

The test sequences presented in FIGS. 6A-B are a single sequential test sequence in which each NCD is activated sequentially. When this single sequential test sequence is applied to a set of NCDs (e.g., N NCDs), each NCD-k is pre-configured for executing (N−1) tests, and each test is directed from NCD-k to a NCD-j where (k<>j). Between any two tests the control algorithm waits for Td time, as defined in the test scheduling table (ST) 24 so that no tests would run concurrently on any NCDs. The process may be presented below:

Trigger test on k NCD where {k: 1 ... N}
{
  Trigger test on NCD k to NCD j
  where j {j: 1 ... N∩j~=k}
  wait(Td)
}

The sequence of active tests initialized by the test probes (i.e., NCDs) is as follows:

NCD-1 to NCD-2
NCD-1 to NCD-3
...
NCD-1 to NCD-N
NCD-2 to NCD-N
NCD-2 to NCD-3
...

The above-described single sequential test sequence is almost the most simple test sequence, but may not be optimal for testing complex networks. In fact, in one embodiment of the present invention, various test patterns are possible depending on the needs and constraints of monitored networks. To define and select a particular test pattern for a particular monitored network, one needs to identify the testing capacity of the network. In other words, one needs to estimate the traffic load generated by the performance tests. The amount of traffic generated by the NCDs or test probes can be estimated as follows:

Amount of traffic on one link (BW1)=traffic generated by one by test probe (BWp)×number of probes simultaneously using the link (n)

Or:

$$BW1 = BWp * n$$

Amount of traffic generated by all the probes in the network (BWn)=traffic generated by one by test probe (BWp)×number of probes in the system simultaneously activated (N)

Or:

$$BWn = BWp * N$$

Where BWp, BWn and BW1 are in [Kbps].

Based upon the traffic estimate, particular test patterns may be defined to match the specific needs of any given network. For illustration purposes, a few test patterns as recommended for specific types of networks are described below with reference to FIGS. 7-10 respectively.

Figure 7:
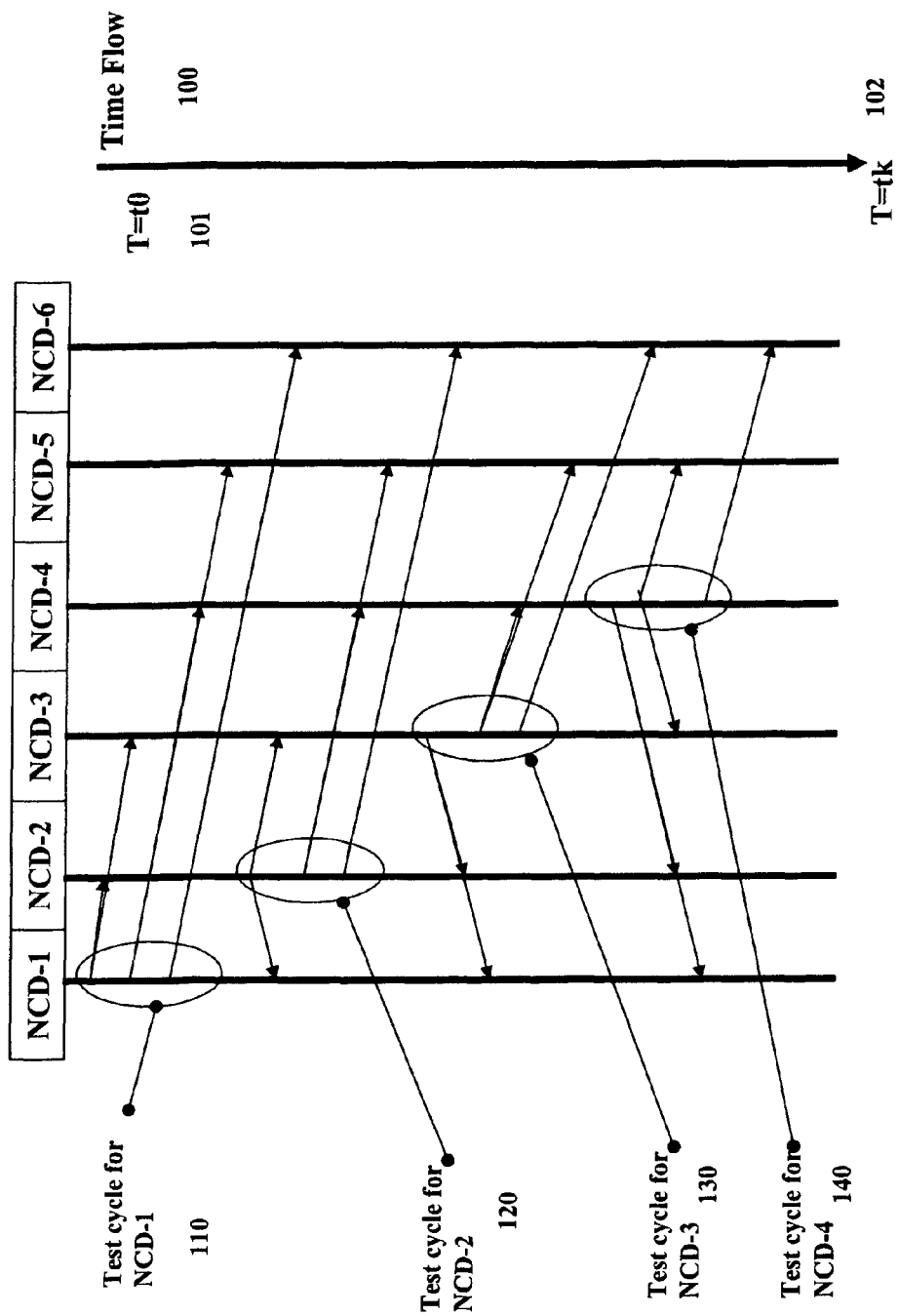

FIG. 7 presents the double sequential test pattern. In this test pattern each NCD is activated in sequence, but every time the activated NCD runs two tests concurrently. This test pattern is recommended for networks in which the tested network segment can carry the amount of test traffic equal to two tests. As illustrated in FIG. 7, the test sequence for network with 6 NCDs is as follows:

NCD-1-NCD-2 and NCD-1-NCD-3
NCD-1-NCD-4 and NCD-1-NCD-5
NCD-1-NCD-6
NCD-2-NCD-1 and NCD-2-NCD-3
NCD-2-NCD-4 and NCD-2-NCD-5
NCD-2-NCD-6
...

Figure 8:
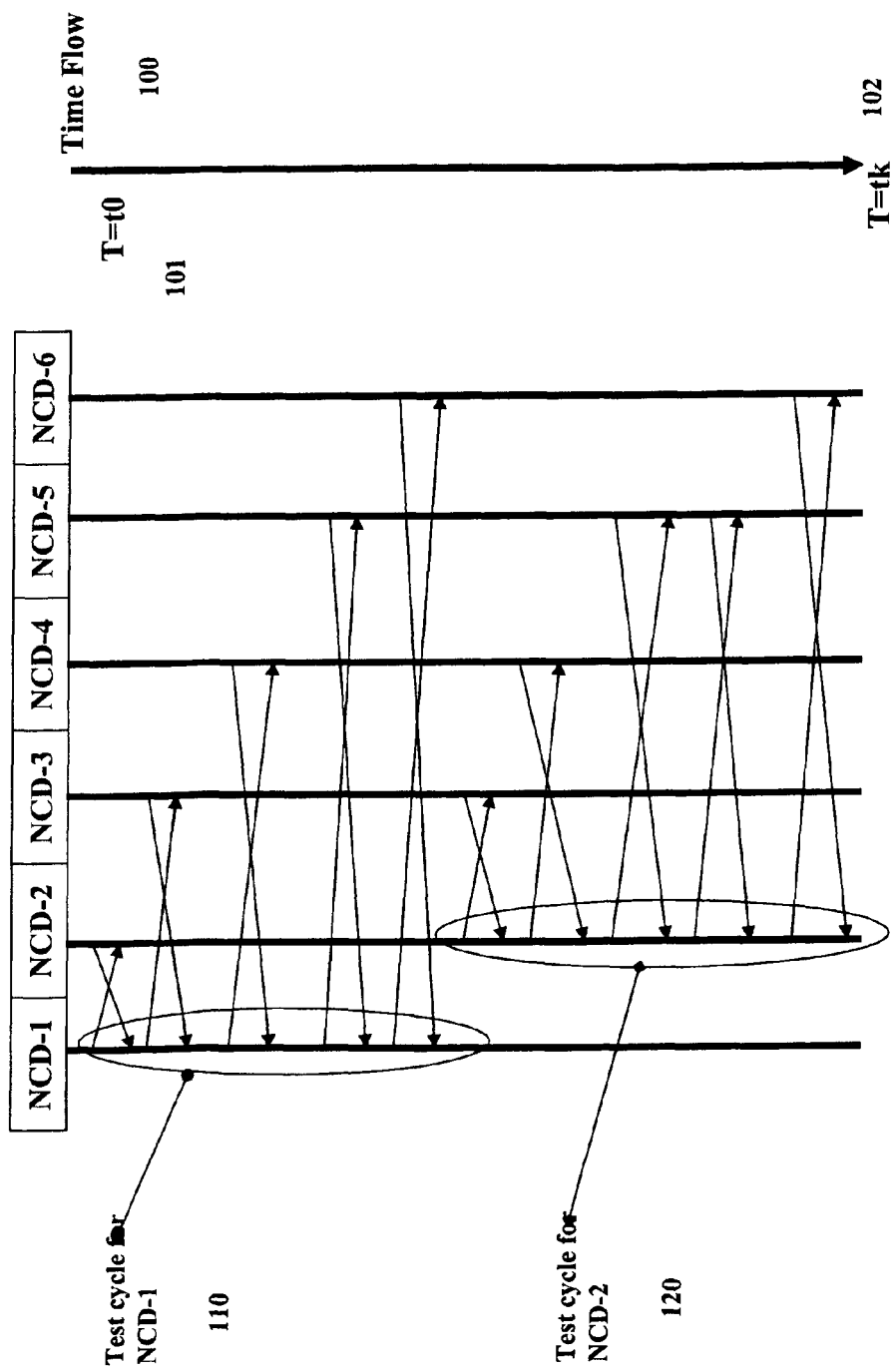

FIG. 8 presents the double pair-wise test pattern. In this test pattern, two NCDs are activated simultaneously and send the test traffic to each other. This pattern generates traffic load on each link or test connection equal to two tests. This test pattern is recommended for networks in which the tested network segment can carry the test traffic equal to two tests. As illustrated in FIG. 8, the test sequence for network with 6 NCDs is as follows:

NCD-1-NCD-2 and NCD-2-NCD-1
NCD-1-NCD-3 and NCD-3-NCD-1
NCD-1-NCD-4 and NCD-4-NCD-1
NCD-1-NCD-5 and NCD-5-NCD-1
. . .

Figure 9:
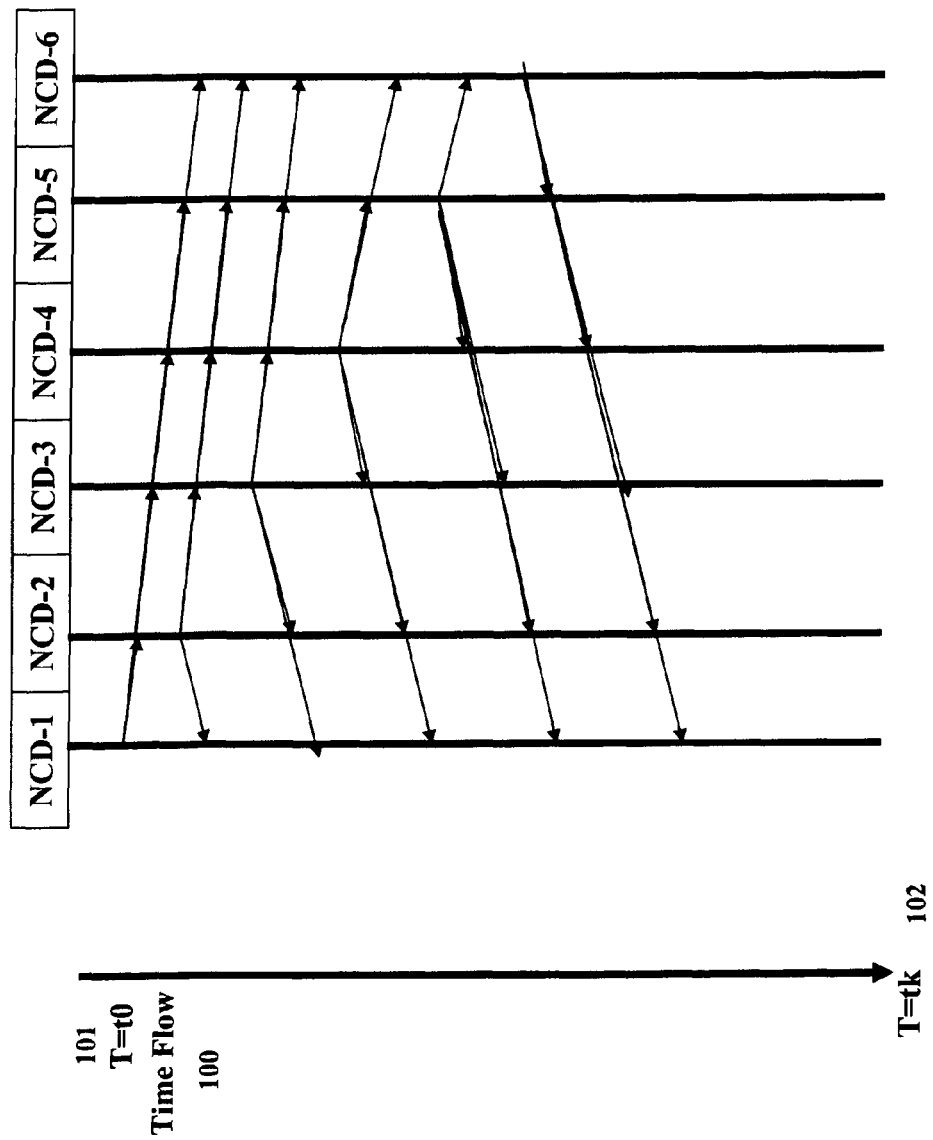

FIG. 9 presents the single maximum parallel test pattern. In this test, one NCD fires tests to all other NCDs simultaneously. After this test cycle is finished another NCD repeats the sequence. This pattern generates the traffic load on each link or test connection equal to the load of all the activated tests. As illustrated in FIG. 9, the test sequence for network with 6 NCDs is as follows:

NCD-1-NCD-2 and NCD-1-NCD-3 and NCD-1-NCD-4 and
NCD-1-NCD-5 and NCD-1-NCD-6
. . .

Figure 10:
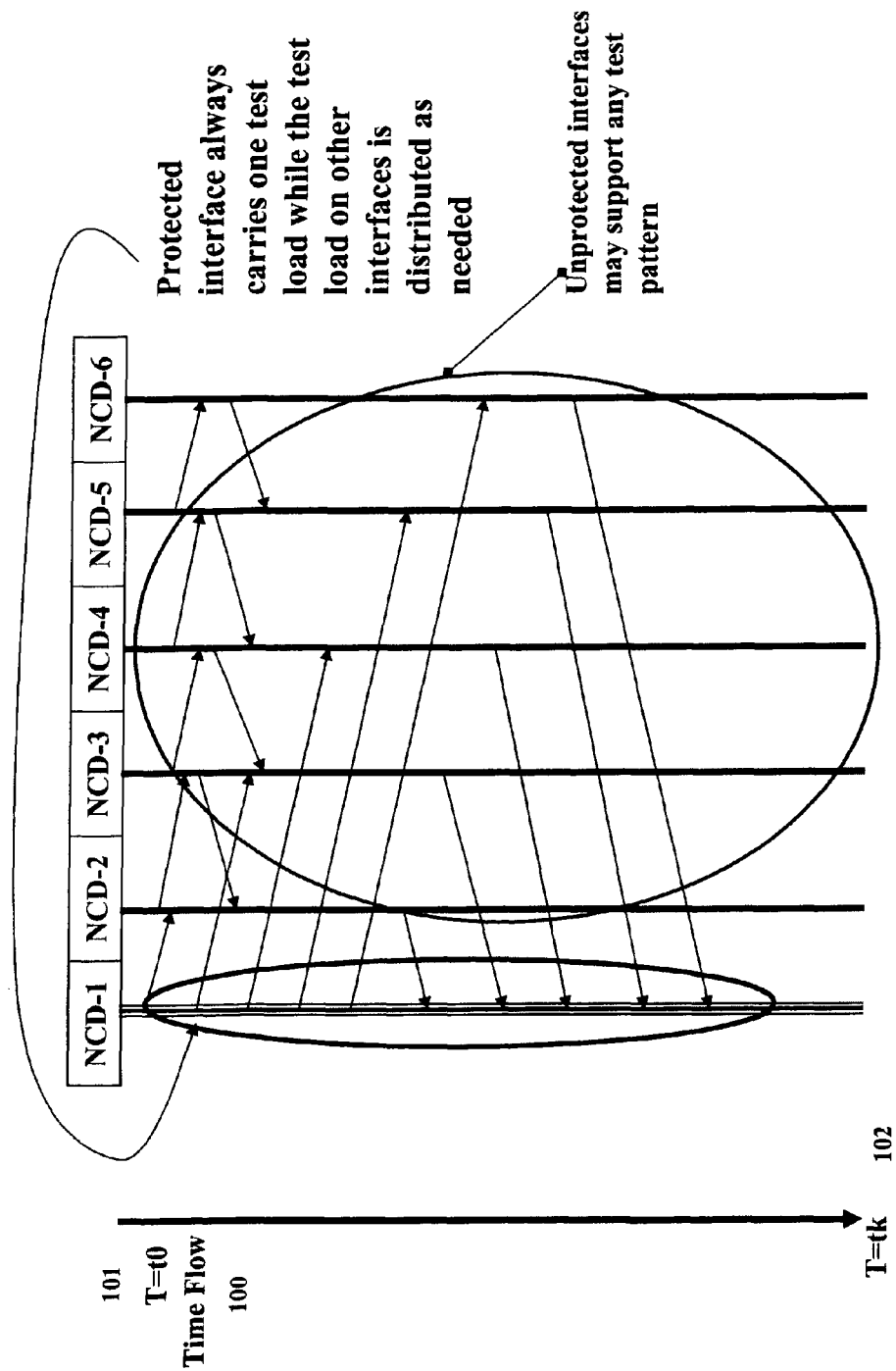

FIG. 10 presents an asymmetric test pattern in which one link or test connection is protected. Asymmetric test patterns are used in cases when some links in the tested network have lower bandwidth than other links. In such cases, the protected interface always carries limited number of tests subject to the interface bandwidth, while other interfaces can carry tests without such restriction. As shown in FIG. 10, the test pattern for a network with 6 NCDs with the protected interface on the NCD-1 is as follows:

NCD-1-NCD-2 and
NCD-2-NCD-3 and NCD-3-NCD-4 and NCD-4-NCD-5 and NCD-5-NCD-6;
NCD-1-NCD-3 and
NCD-3-NCD-2 and NCD-4-NCD-5 and NCD-5-NCD-6;
NCD-1-NCD-4;
NCD-1-NCD-5;
NCD-1-NCD-6;
. . .

FIG. 11 summarizes a variety of test patterns for defining test schedules that optimize the performance testing for the variety of network architectures. These test patterns may be grouped into two categories: symmetric [S] and asymmetric [A].

Symmetric test patterns can be classified into one-way and two-way (or pair-wise) tests. Based on the number of concurrently activated probes or NCDs, each type of symmetric test patterns can be further classified into single [SS], double [SD], maximizing [SM], etc. Then based on the number of active tests per probe (NCD), each test pattern can be further classified into single, double, etc. For example, a symmetric one-way test pattern with a single activated probe [SS] can be further classified into single [SSS], double [SSD], etc. based upon the number of active tests running on the activated probe (NCD).

Asymmetric test patterns are tests patterns with protected links. Based on the number of protected links, asymmetric test patterns can be further divided as having single [AS], double [AD], triple [AT], etc. protected links. Because even under asymmetric test patterns, those probes (NCDs) without protected links may be activated concurrently, as under symmetric test patterns, each type of asymmetric test patterns can be further classified based on the number of concurrently activated probes as well as the number of concurrent active tests per probe.

System Implementation: An Example

FIG. 12 provides an example of the system according to one embodiment of the present invention. In FIG. 12, the monitored network 40 includes interLATA Backbone IP networks (IXC) 410, IntraLATA IP Core networks 420, an IntraLATA Fast Packet network 430, IntraLATA TLS networks 440 and ATM networks 450. NCDs 10 are connected or integrated with selected network elements of the monitored network 40. Specifically, NCD-1 and NCD-2 are connected to two ATM switches of the ATM networks 450 respectively; NCD-3 and NCD-4 are connected to two TLS switches of the IntraLATA TLS networks 440 respectively; NCD-5 and NCD-7 are connected to two core routers of the IntraLATA IP Core networks 420 respectively; and NCD-6 and NCD-8 are connected to two edge routers of the IntraLATA IP Core networks 420 respectively.

All NCDs 10 are logically connected to each other to form the test connections or monitored paths. As shown in FIG. 12, the performance of the network 40 is monitored through testing the following paths:

TABLE 4

Test Paths/Connections

| Path | Description |
| --- | --- |
| Path A | long distance (interLATA) path between ATM networks |
| Path B | long distance path between two TLS intraLATA networks |
| Path C | short distance path between edge and core routers in one LATA |
| Path D | long distance path between edge routers of two intraLATA networks |
| Path E | long distance path between core routers in two different LATAs (IntraLATA) |

All NCDs 10 are also connected to the NCDCS 20 that provides centralized control and management of NCD operations. In FIG. 12, only two LATAs are illustrated. In practice, however, any number of LATAs may be included in the overall network architecture. As can be easily appreciated, with the increase of LATAs in the monitored network, traffic congestion is likely to occur on the NCD interfaces if all NCDs fire tests at preset times without sufficient coordination. With the NCDs 10 and NCDCS 20 being pre-configured with the above-described data structures, the control algorithm, and the trigger mechanisms, the performance tests in the monitored network can be coordinated on the global-network scale, thereby avoiding test storms and link congestions. More importantly, one or more particular test patterns as the basis for scheduling tests may be defined to match the different bandwidth along different test paths as presented in FIG. 12. For instance, Path E that is established between two core routers may provide better bandwidth and thus carry a larger amount of test traffic than other test paths. As a result, Path E may be scheduled for executing more concurrently active tests than other paths. By means of customizing test patterns and test schedules for the monitored network, the testing efficiency can be maximized despite the network-wide coordination.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

The invention claimed is:

1. A system that synchronizes a plurality of network performance tests via a network performance test pattern, wherein the system is configured to:

generate an estimated traffic load calculated based on a test traffic amount produced from at least one network performance test of the plurality of network performance tests expected to be executed, by a first collection device of a plurality of collection devices, on a first link of the first collection device, where the first link is one of a plurality of logical links that interconnect to the plurality of collection devices;
generate the network performance test pattern based on the estimated traffic load; and
send a trigger message according to the network performance test pattern to the first collection device to execute the at least one network performance test of the plurality of network performance tests, wherein the network performance test pattern identifies the plurality of collection devices in a sequence and instructs the system to send the trigger message to a pair of collection devices according to the sequence.

2. The system of claim 1, wherein the trigger message is one of a plurality of trigger messages,
wherein the system generates the network performance test pattern based on the estimated traffic load to include an execution order and start times for the plurality of trigger messages, and
wherein the network performance test pattern based on the execution order and the start times synchronizes the plurality of network performance tests to produce an actual traffic load below the estimated traffic load.

3. The system of claim 1, wherein the estimated traffic load is calculated from a product of the test traffic amount and a number of network performance tests that can simultaneously operate on the first link.

4. The system of claim 1, wherein the estimated traffic load is calculated from a product of the test traffic amount and a number of network performance tests that can simultaneously operate within the system.

5. The system of claim 1, further configured to:
verify that an actual traffic load generated by the at least one network performance test is less than a pre-defined test traffic load; and
adjust the network performance test pattern when the actual traffic load exceeds the pre-defined test traffic load.

6. The system of claim 5, the system adjusts the network performance test pattern by being configured to reschedule the at least one network performance test at a later time.

7. The system of claim 1, wherein
the trigger message is one of a plurality of trigger messages,
the system generates the network performance test pattern based on the estimated traffic load to include an execution order and start times for the plurality of trigger messages, and
the network performance test pattern based on the execution order and the start times synchronizes the plurality of performance tests to produce an actual traffic load below the estimated traffic load; and
the system is further configured to:
verify that an actual traffic load generated by each network performance test is less than a pre-defined test traffic load, and
adjust the network performance test pattern when the actual traffic load exceeds the pre-defined test traffic load.

8. The system of claim 1, further configured to store a network performance test schedule that includes a start time that indicates when to send the trigger message.

9. The system of claim 1, wherein the network performance test pattern identifies the plurality of collection devices in sequence and instructs the system to send the trigger message to each collection device according to the sequence.

10. The system of claim 9, wherein the at least one network performance test is a set of parallel network performance tests on all logical links of the plurality of logical links that are connected to each collection device.

11. A method for synchronizing a plurality of network performance tests via a network performance test pattern, comprising:
generating an estimated traffic load calculated based on a test traffic amount produced from at least one network performance test of the plurality of network performance tests expected to be executed, by a first collection device of a plurality of collection devices, on a first link of the first collection device, where the first link is one of a plurality of logical links that interconnect to the plurality of collection devices;
generating the network performance test pattern based on the estimated traffic load; and
sending a trigger message according to the network performance test pattern to the first collection device to execute the at least one network performance test of the plurality of network performance tests, wherein the network performance test pattern identifies the plurality of collection devices in a sequence and instructs the system to send the trigger message to a pair of collection devices according to the sequence.

12. The method of claim 11, wherein the trigger message is one of a plurality of trigger messages,
wherein the network performance test pattern is generated to include an execution order and start times for the plurality of trigger messages, and
the method further comprises synchronizing, via the network performance test pattern based on the execution order and the start times, the plurality of network performance tests to produce an actual traffic load below the estimated traffic load.

13. The method of claim 11, wherein the estimated traffic load is calculated from a product of the test traffic amount and a number of network performance tests that can simultaneously operate on the first link.

14. The method of claim 11, wherein the estimated traffic load is calculated from a product of the test traffic amount and a number of network performance tests that can simultaneously operate within the system.

15. The method of claim 11, further comprises:
verifying that an actual traffic load generated by the at least one network performance test is less than a pre-defined test traffic load; and
adjusting the network performance test pattern when the actual traffic load exceeds the pre-defined test traffic load.

16. The method of claim 11, wherein the at least one network performance test is a set of parallel network performance tests on all logical links of the plurality of logical links that are connected to each collection device.

17. A non-transitory computer-readable storage medium storing instructions that, when provided to a processor, cause the processor to perform the method of claim 11.

18. The method of claim 11, further comprising the network performance test pattern identifying the plurality of collection devices in sequence and instructing the system to send the trigger message to each collection device according to the sequence.

19. The method of claim 15, wherein
the trigger message is one of a plurality of trigger messages, the generating of the network performance test pattern includes an execution order and start times for the plurality of trigger messages, and the generating of the network performance test pattern synchronizes the plurality of performance tests to produce an actual traffic load below the estimated traffic load.

20. The method of claim 11, wherein the adjusting the network performance test pattern when the actual traffic load exceeds the predefined test traffic load is done by rescheduling the at least one network performance test to a later time.

* * * * *